US008631481B2

(12) United States Patent
Fromentoux et al.

(10) Patent No.: US 8,631,481 B2
(45) Date of Patent: Jan. 14, 2014

(54) ACCESS TO A NETWORK FOR DISTRIBUTING DIGITAL CONTENT

(75) Inventors: Gaël Fromentoux, Ile Grande (FR); Frédéric Fieau, Perros Guirec (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/516,817

(22) PCT Filed: Dec. 13, 2010

(86) PCT No.: PCT/FR2010/052698

§ 371 (c)(1), (2), (4) Date: Jun. 18, 2012

(87) PCT Pub. No.: WO2011/073560

PCT Pub. Date: Jun. 23, 2011

(65) Prior Publication Data

US 2012/0260318 A1 Oct. 11, 2012

(30) Foreign Application Priority Data

Dec. 18, 2009 (FR) .................................... 09 59187

(51) Int. Cl.
*H04L 29/06* (2006.01)

(52) U.S. Cl.
USPC .............................................. 726/9; 713/185

(58) Field of Classification Search
USPC .............................................. 726/9; 713/185
See application file for complete search history.

(56) References Cited

U.S. PATENT DOCUMENTS

2002/0147929 A1* 10/2002 Rose ............................ 713/201
2006/0129686 A1* 6/2006 Tanaka ......................... 709/229
2008/0307517 A1* 12/2008 Grigoriev et al. ................ 726/9

OTHER PUBLICATIONS

Adida, Ben. "Sessionlock: securing web sessions against eavesdropping." Proceedings of the 17th international conference on World Wide Web. ACM, 2008.*
Kangasharju et al., "Locating Copies of Objects Using the Domain Name System," Proceedings of the International Caching Workshop, pp. 1-12 (Jan. 1, 1999).

* cited by examiner

*Primary Examiner* — Kambiz Zand
*Assistant Examiner* — Michael Guirguis
(74) *Attorney, Agent, or Firm* — Drinker Biddle & Reath LLP

(57) ABSTRACT

A transmission of a digital content to a user terminal is managed by a network comprising a service subnetwork adapted for providing the terminal with a service token, and a digital contents distribution subnetwork which includes a control part and a transmission part. The control part of the distribution subnetwork receives a request from the user terminal for a digital content, indicating a service token. Next, if the service token is recognized as valid, an address relating to the distribution subnetwork is determined and a session token associated with said address is generated. A message indicating said address and the session token associated with said address is then transmitted to the user terminal.

14 Claims, 4 Drawing Sheets req C° — 21
URL 1 + Token 1 — 22
Tx Token 1 → URL 1 — 23
URL 2 + Token 2 — 24
Tx Token 2 → URL 2 — 25
Rx C° — 26

ACCESS TO A NETWORK FOR DISTRIBUTING DIGITAL CONTENT

CROSS-REFERENCE TO RELATED APPLICATIONS

This application is the U.S. national phase of the International Patent Application No. PCT/FR2010/052698 filed Dec. 13, 2010, which claims the benefit of French Application No. 09 59187 filed Dec. 18, 2009, the entire content of which is incorporated herein by reference.

The invention relates to the management of access to a network for distributing digital content, particularly such access management when based on the use of tokens.

BACKGROUND

A content delivery network or CDN may comprise multiple servers which cooperate with each other to send digital content to user terminals. However, a user can only access the digital content if he meets certain criteria. Access to digital content can be controlled for example on the basis of a subscription which gives the user access to certain digital content, or on the basis of a payment made for each access to a digital content item.

To achieve this, the architecture of such a network is based partly on a service subnetwork, which handles verifying whether a user terminal has the right to access the digital content the user is requesting, and partly on a digital content distribution subnetwork, which handles sending the digital content to a user terminal that has requested it. In this type of content delivery network, it is important to establish security measures which control access to the delivered content.

In such an architecture, a user terminal first requests a digital content item from the service subnetwork. Then, once this service subnetwork has decided that the user terminal has the right to access the requested digital content, it responds to this request by redirecting the terminal to one or more elements of the digital content distribution subnetwork able to deliver the requested digital content to the user, or digital content servers.

In order to control and ensure the security of the distribution of this digital content to a user terminal, the service subnetwork can be set up to respond to the user terminal by indicating:

a URL (Uniform Resource Locator) address; and a token.

Then the user terminal uses this URL address and this token to request the content concerned from the digital content server or servers.

Under these conditions, the digital content server provides the requested digital content to the user terminal only if the token is considered to be valid. Such a mechanism provides secure access to the digital content.

However, even if the distribution subnetwork verifies the token before distributing the digital content, this mechanism is based on a security measure which is applied at the level of the service subnetwork exclusively. Access to the requested digital content is based on a token which is provided by the service network.

SUMMARY

The invention aims to improve the situation.

A first aspect of the invention proposes a method for managing the transmission of a digital content item to a user terminal in a network comprising a service subnetwork adapted to provide the terminal with a service token and a digital content distribution subnetwork which includes a control part and a transmission part, said service token being associated with an address of the distribution subnetwork; said management method comprising the following steps in the control part of the distribution subnetwork:

/1/ receiving a request from the user terminal for a digital content item, indicating a service token;

/2/ if the service token is recognized as valid, determining an address relating to the distribution subnetwork and generating a session token associated with said address; and /3/ sending a message to the user terminal, indicating said address and the session token associated with said address.

The term "digital content" is understood to mean any type of digital data corresponding to a content item or set of content items which can be transmitted in the network concerned in the form of a data stream. Some examples are document data or image data or audio data or video data, or multimedia data in general.

The term "token" is understood to mean a data item which gives the terminal that possesses it access to network equipment which is able to validate this token. A token therefore allows certifying the validity of an access request. Its use provides network access security. No limitation is placed on the nature of the token. Here it is associated with an address. It could correspond to a signature for the address it is associated with or an encryption of this address, for example.

In the context of the invention, an address may correspond to a string of standard characters serving to identify and locate resources available on a network, such as the Internet, and access them with a browser. It could be a URL address for example. A URL address can be sent via a protocol such as HTTP (HyperText Transfer Protocol) or via a web page, for example. Here, the network comprises a service subnetwork and a distribution subnetwork. The service subnetwork is adapted to provide the terminal with a service token. No limitation concerning this aspect is placed on the invention.

The user terminal has a service token previously provided to it by the service subnetwork. It can therefore request digital content from the distribution network, indicating the service token. The first token (the service token) represents a first level of security in the access to the digital content distribution network, in the sense that the terminal indicates this service token in its request to the distribution subnetwork. The distribution subnetwork can therefore verify at this point whether the user terminal has indeed been previously authorized by the service subnetwork to obtain the digital content requested at the indicated address, because the service token must be associated with this address, in one embodiment of the invention. For this purpose, the verification subnetwork comprises a control part and a transmission part. After its authorization by the service subnetwork, the user terminal is redirected to an address which corresponds to the control part of the distribution subnetwork. This control part can then generate another token (the session token) if the service token associated with the request from the user terminal appears to be valid. Then the session token is sent to the user terminal, indicating to the terminal an address redirection to the transmission part of the distribution subnetwork which can actually send the desired digital content.

Note that these tokens are generated in a manner that is associated with the respective addresses in the distribution subnetwork. This association of a token with the next address indicated, and therefore selected for the user terminal, guarantees a certain level of security against attacks based on capturing one of these tokens and fraudulently reusing it. These tokens cannot be used for any random address in the distribution subnetwork, as they are each associated with specific addresses in the distribution subnetwork.

Because of these arrangements, it is advantageously possible to apply verifications sequentially linked to each other in order to increase the level of security of such a digital content transmission network. Note that the first token is linked to a first verification at the service level, then the second token is only generated if the first token is recognized to be valid in the transmission part of the network. The second token is used for actually receiving the digital content at the user terminal.

The first token, the service token, therefore corresponds to a verification performed at the service level which gives access to the distribution subnetwork. This is a first security measure implemented in the service subnetwork.

Then the second token, the session token, corresponds to a verification performed at the transmission level on the basis of the first verification. This is a second security measure implemented in the distribution subnetwork. Advantageously, these two security measure can be set up independently, as long as the service and distribution subnetworks agree beforehand on the service tokens to be used. This independence in the management can be very useful when the service subnetwork and the distribution subnetwork are not managed by the same administrator. The two administrators can then be relatively independent in defining their security rules.

It is thus possible to set up a security measure specific to the content distribution subnetwork, unlike in the prior art system. Thus the distribution subnetwork can, for example, establish its own rules for shared key distribution, define a shared key size specific to itself, or define a suitable encryption algorithm. Under these conditions, a change in the security measures for the distribution subnetwork does not cause a change in the security measures for the service subnetwork.

The two types of tokens used in this context correspond to two distinct types of verification. In addition, they have a nested dependency because the second token is only generated if the first token is recognized to be valid.

This sequence of nested verifications greatly increases the level of security.

In this advantageous context, a higher level of security can easily be put in place. Not only is the security of the network access based on the use of a token generated at the service level and associated with a first address, but the security of the access is also based on the use of an additional token generated at the digital content transmission level and associated with a second address.

In addition, the service token and the session token may be associated with the user terminal. Such an association increases the level of security in the network concerned. It prevents reuse of the token by any user terminal other than the one associated with the token. In fact, if the distribution subnetwork stores the association between the service token and the user terminal, it is then able to refuse any transaction with another user terminal based on the same service token.

In step /2/, it is easy to allow determining a plurality of digital content items available in the distribution subnetwork, as well as generating a plurality of session tokens respectively associated with said plurality of digital content items.

In step /2/, a plurality of addresses relating to the distribution subnetwork can be determined and a plurality of session tokens respectively associated with said plurality of addresses can be generated.

By generating one token per address, the security level for the access to a digital content item can thus be increased.

The session token can be protected using a session key which is shared at the distribution subnetwork level. This further increases the level of security in such a system.

It may also be advantageous to encrypt other parameters using the same key. These same parameters are then sent to the distribution subnetwork, also in their encrypted form. In this manner, the level of security in this digital content distribution network can be further increased.

In the context of the invention, it is easy to allow for generating one unique service token per transaction with a user terminal. A user terminal can therefore have one unique certification element per purchase transaction. This certification element provides increased protection against attacks.

Any request made at the distribution subnetwork level can be verified on the basis of the service token. In the case where a new service token is generated at each request, it is easy to detect and refuse any new request for digital content that has already been distributed.

The use of a session token provides reliable control of which of the server(s) of the distribution subnetwork will handle the transmission of the requested content and also to what recipient it is to be sent, regardless of how many elements of the network are involved in the distribution of the digital content. The reliability of this control is dependent on the mechanism used for sharing session tokens in the CDN.

A second aspect of the invention proposes a method for managing the transmission of a digital content item to a user terminal in a network comprising a service subnetwork and a digital content distribution subnetwork which includes a control part and a transmission part;

said management method comprising the following steps in the service subnetwork:

/1/ receiving a request from the user terminal for a digital content item;

/2/ deciding whether to authorize the user terminal on the basis of decision criteria;

/3/ determining an address relating to the distribution subnetwork and generating a service token associated with said address; and /4/ sending a message to the user terminal, indicating said address and the associated service token.

Here, the user terminal is requesting a digital content item. Certain decision criteria are taken into consideration in order to decide whether the terminal is authorized to receive the digital content requested. No limitation is placed on the type of decision criteria to be taken into account here.

These criteria may correspond to a subscription or to a paid amount, for example.

It can be arranged so that, when a user terminal wants to receive a digital content item or a set of digital content items, it issues a corresponding request to the service subnetwork. This subnetwork can then handle deciding whether or not the user terminal is authorized to receive this digital content. Any type of authorization mechanism can then be applied. In particular, it can be set up so that only the user terminals which have previously obtained a subscription to a corresponding service can receive this digital content. Or it could be set up so that the user terminal issues its request by paying an amount corresponding to the unit cost associated with the digital content item or set of digital content items.

Regardless of the mechanism used in the service subnetwork for deciding that the user terminal is authorized to receive the requested digital content, the service subnetwork then generates a first token for this user terminal (the service token). No limitation is placed on the generation of this type of token according to an embodiment of the invention.

The service subnetwork then indicates, to the authorized user terminal, an address relating to the distribution subnetwork and the associated service token.

In one embodiment of the invention, the tokens are generated using a secret key. In general, a service key is available to the service subnetwork and a session key is available to the distribution subnetwork. The service key is then also known to the distribution subnetwork, to allow this network to verify the validity of the service token indicated by a user terminal.

Thus, at the user terminal, the service token is received and indicated in encrypted form using a service key known to both the service subnetwork and the distribution subnetwork; and the session token is received and indicated in encrypted form using a session key which is known to the distribution subnetwork.

In one embodiment of the invention, the service subnetwork does not know the service key and it requests the encryption, sending the data to be encrypted to the distribution subnetwork. In addition, it is possible for the service key and session key to be identical.

By thus sharing a token between service and distribution and using several types of tokens according to an embodiment of the invention, the level of security for accessing a digital content item in such a network is increased.

It is therefore advantageously possible to decouple the purchase transaction from the various corresponding digital content transmission transactions. It is also easy to track an authorized number of transmission sessions for a service token generated for a given user terminal.

A third aspect of the invention proposes a method for managing the transmission of a digital content item to a user terminal in a network comprising a service subnetwork and a digital content distribution subnetwork which includes a control part and a transmission part;

said management method comprising the following steps at the user terminal:

/1/ requesting a digital content item from the service subnetwork;

/2/ receiving a first address relating to the control part of the distribution subnetwork and a service token associated with said first address;

/3/ requesting the digital content item from said first address, indicating the service token associated with said first address;

/4/ receiving a second address relating to the transmission part of the distribution subnetwork and a session token associated with said second address;

/5/ requesting the digital content item from said second address, indicating the session token associated with said second address; and /6/ receiving the digital content.

The service token may be received and indicated in encrypted form using a service key known to both the service subnetwork and the distribution subnetwork; in this case, the session token is received and indicated in encrypted form using a session key which is known to the distribution subnetwork.

In one embodiment, in step /4/, a plurality of addresses relating to the transmission part of the distribution subnetwork and a plurality of session tokens respectively associated with said plurality of addresses are received; and in step /5/, the digital content is requested from said plurality of addresses while respectively indicating the session tokens associated with said plurality of addresses.

By generating one token per address, the level of security for the access to the digital content can thus be increased.

It may also be arranged so that the service token and the session token are additionally associated with a transaction corresponding to step /1/ and with a transaction corresponding to step /5/. Such an association further increases the level of security in the network concerned. It avoids any reuse by the same user terminal. To detect a token reuse situation regardless of whether the token is being reused by the user terminal concerned or by another user terminal, it is sufficient to have the digital content management network store the association between a token and the corresponding transaction. The token concerned can be associated with a transaction identifier for the request in progress, either in the service subnetwork in step /1/ or in the control part of the distribution subnetwork in step /5/. It is sufficient, for example, to store an identifier for the transaction corresponding to step /1/ in association with the service token, and an identifier for the transaction corresponding to step /2/ in association with the session token.

It may also be arranged so that the service token and the session token are additionally associated with a transaction corresponding to step /1/ for the purchase of a set of digital content items. It may also be arranged so that the service token is additionally associated with a set of session tokens for a set of transactions corresponding to step /5/. Such an association not only further increases the level of security but also allows having several transactions for the one transaction in step /1/ and therefore several deliveries corresponding to the associated set of content in step /5/ in the network concerned. This avoids a one-to-one correspondence between the service token and the session token. In addition, this allows optimizing the resources of the content distribution subnetwork because the controller for the distribution subnetwork can select multiple sub-controllers for the digital content distribution and can generate one session token per selected subcontroller.

These associations may be stored in a database shared by the different network elements. They may also be directly stored locally in file format and shared across the network.

A fourth aspect of the invention proposes a controller for a distribution subnetwork, comprising a means for implementing a method according to the first aspect of the invention.

A fifth aspect of the invention proposes a service subnetwork, comprising a means for implementing a method according to the second aspect of the invention.

A sixth aspect of the invention proposes a network comprising a user terminal, a service subnetwork according to the fifth aspect of the invention, a controller according to the fourth aspect of the invention, and a transmission part arranged to verify the validity of the session token.

A seventh, eighth, and ninth aspect of the invention proposes a computer program comprising instructions for implementing the method of the first, second, and third aspect of the invention respectively, when this program is executed by a processor.

Other features and advantages of the invention will be apparent from reading the following description of one of its embodiments.

BRIEF DESCRIPTION OF THE DRAWINGS

The invention will also be better understood by examining the drawings, in which.

DETAILED DESCRIPTION

Figure 1:
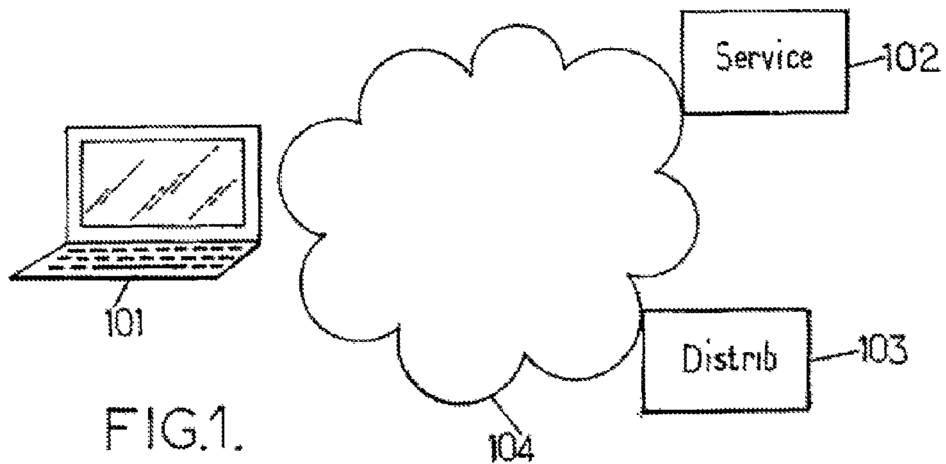
FIG. 1 illustrates a general architecture suitable for implementing a method for managing the transmission of digital content according to a first embodiment of the invention.

FIG. 1 illustrates a general architecture suitable for implementing a method for managing the transmission of digital content according to an embodiment of the invention. A communication network 104 connects a user terminal 101, a service subnetwork 102, and a distribution subnetwork 103. The user terminal 101 requests digital content from the service subnetwork 102 and receives it from the distribution subnetwork 103. The service subnetwork 102 receives a request for digital content from a user terminal and decides whether this user terminal is authorized to receive the digital content it is requesting. No limitation is placed on the invention concerning the making of this decision, or the types of decision criteria taken into account by the service subnetwork for authorizing the transmission of the digital content to this user terminal.

When the service subnetwork decides to authorize this transmission, it provides the user terminal with the data necessary to contact the distribution subnetwork in order to receive the digital content according to one embodiment. This architecture is based on two subnetworks which each apply a verification, sequentially and in a nested dependency, concerning the access to the digital content requested according to an embodiment.

Figure 2:
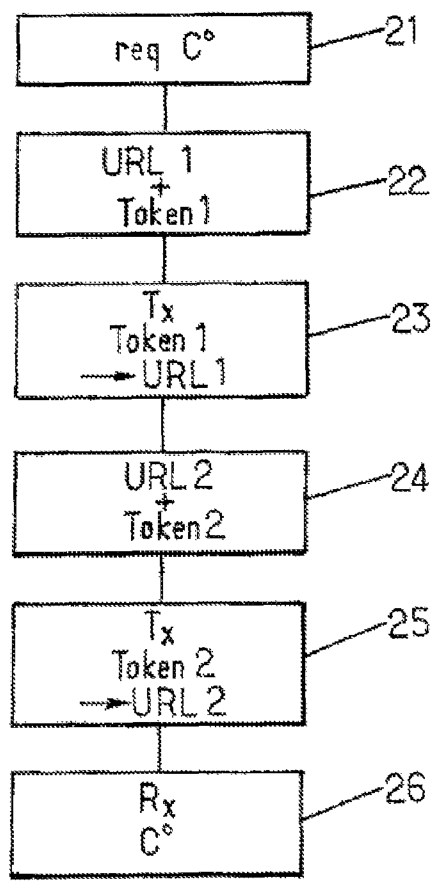
FIG. 2 illustrates the main steps of a method according to an embodiment of the invention, at a user terminal.

FIG. 2 illustrates the main steps of a method for managing the transmission of digital content in a network according to an embodiment of the invention, at a user terminal. Illustrating this method at the terminal allows illustrating both the interface with the service subnetwork and the interface with the distribution subnetwork. At a user terminal, in step 21, a digital content item is requested from the service subnetwork 102. Then, in response, if the user terminal has the right to access this digital content, it receives in step 22 a first address URL1 relating to the control subnetwork and a service token Token1 associated with the first address. Then, based on this information received, the user terminal can request the digital content from the distribution subnetwork. An address may correspond to a string of standard characters serving to identify and locate resources accessible on a network, such as the Internet, and access them with a browser. It could be a URL address for example. A URL address can be sent via the HTTP protocol or via a web page, for example.

In step 23, the user terminal is directed to the first address URL1 and provides the associated service token to this first address. More specifically, the first address URL1 corresponds to a control entity of the distribution subnetwork. This control entity, or controller, is in charge of verifying the validity of the service token.

Next, if the service token is recognized to be valid, the controller selects an entity of the transmission part which has the ability to manage the transmission of the requested digital content. A second address URL2 in the network corresponds to this entity of the distribution subnetwork. The control entity then generates a session token Token2 associated with the second address URL2 for the user terminal. The selected entity of the transmission subnetwork is then indicated to the user terminal by the second address URL2, in association with the generated session token Token2.

In step 24, the terminal receives this second address URL2 relating to the digital content distribution subnetwork, and the associated session token.

Then, in step 25, the user terminal can request the digital content at the second address, indicating the associated session token. The user terminal provides the session token to this second address. If the session token is recognized to be valid, the user terminal can receive the requested digital content in step 26.

Preferably, there is a service key for encrypting the service token in the service subnetwork and for verifying it in a controller of the distribution subnetwork. The service key is therefore shared by the service subnetwork and the distribution subnetwork. However, it is quite possible for the service key to be known to the distribution subnetwork without it being known to the service subnetwork. In this case, the information to be encrypted in the service subnetwork are sent to the distribution subnetwork for encryption then resent to the service subnetwork in encrypted form.

Figure 3:
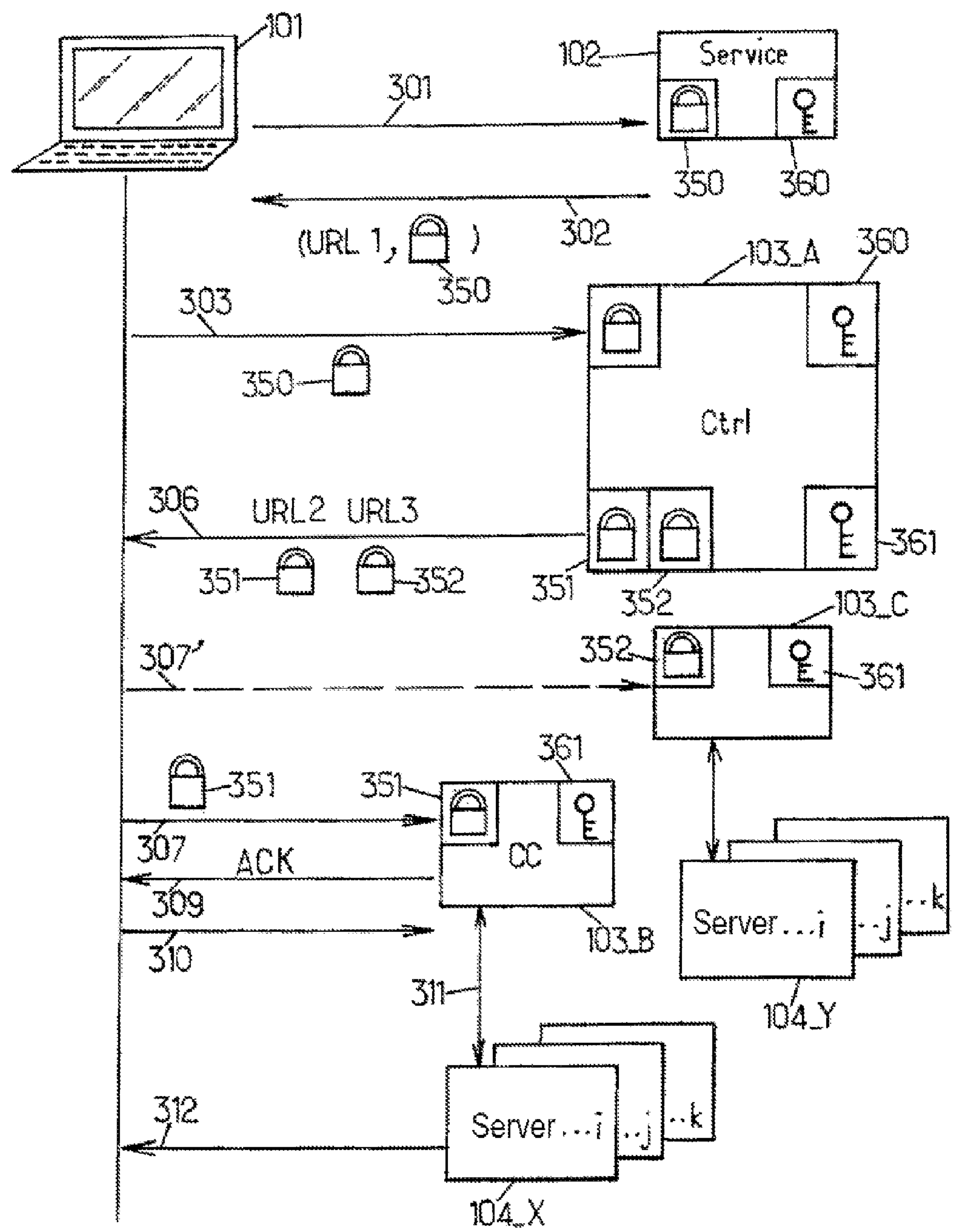
FIG. 3 illustrates an implementation of such a method in a digital content distribution system according to an embodiment of the invention.

FIG. 3 illustrates a digital content distribution architecture according to one embodiment of the invention.

A digital content distribution network may comprise a service subnetwork 102 and a distribution subnetwork 103. The service subnetwork 102 may comprise a plurality of service platforms adapted to generate service tokens using service keys, such as a service key 360.

The distribution subnetwork 103 here comprises a controller 103-A which generates session tokens using a session key 361. It also has a service key 360 available to it which allows it to verify the validity of a service token received from a user terminal when the terminal requests digital content.

The distribution subnetwork 103 may additionally comprise several groups of servers such as server group 104-X i to k and server group 104-Y i to k. These server groups are respectively controlled by subcontrollers 103-B and 103-C (Cluster Controllers).

In one embodiment of the invention, the session key 361 is shared by all entities contained in the distribution subnetwork 103. Thus, regardless of which entity or entities of the distribution subnetwork are involved in the transmission of the digital content requested by the terminal, they are able to verify the session token used in encrypted form in order to detect that it is valid.

It is also easy to have a session key managed by entity or for any group of entities in the distribution subnetwork.

FIG. 3 illustrates exchanges of messages according to one embodiment of the invention. The user terminal 101 wants to receive a digital content item or a set of digital content items. It issues a request 301 to the service subnetwork 102. Upon receipt of this message 301, a service entity of the service subnetwork verifies whether the user terminal meets certain criteria for accessing this digital content, by subscribing to a service which permits it to receive this digital content or by a one-time payment for the digital content, for example. If this request is accepted at the service level, then at least a first address URL1 in the distribution subnetwork 103 is selected and a service token 350 is generated using a service key 360, in association with this first address.

The service token 350 is obtained from a set of associated information when may comprise one, some, or all of the following elements:

- an identifier for a digital content item or an identifier for a set of digital content items;
- a service subnetwork identifier;
- a service identifier indicating a content distribution policy;

a transaction identifier;
a terminal identifier;
the address of a controller 103-A for the distribution subnetwork 103.
a client identifier;
a token validity duration.

The client identifier may be its address in the network, for example an IP address or MAC address, or an Organizationally Unique Identifier or OUI, or a Fixed Access Remote IDentifier or FARID. The presence of this terminal identifier allows preventing reuse by another terminal.

The service subnetwork identifier allows the entity of the distribution subnetwork to determine which service key to use to verify the service token.

The transaction identifier allows establishing a correlation between the requests for service made to the service subnetwork and later notifications of content delivery relating to the distribution subnetwork.

The address of the controller 103-A for the distribution subnetwork 103 allows verifying that the user terminal 101 does not contact network entities it is not authorized to access.

Optionally, the first address URL1 may also comprise a token validity duration, or a parameter limiting the number of authorized distributions (maximum number of authorized plays).

A fingerprint for this set of information (or application of a hash function to this set of information) can be calculated by applying a given algorithm. This fingerprint can then be encrypted using the service key 360 to obtain the service token 350. The predetermined algorithm may be a SHA-1 algorithm (Secure Hash Algorithm), for example.

As a variant, it is also possible to implement a method combining a calculation of the fingerprint using a cryptographic algorithm and the use of a secret key, such as HMAC (Hash-based Message Authentication Code).

This set of information may also be associated with the first address URL1.

The service token 350 thus ensures that the first address URL1 and the associated information have not been modified. It also allows authenticating the origin of this first address URL1.

Next a message 302 is sent to the user terminal 101 indicating both the first address URL1 and the associated service token 350, and optionally the associated information as well.

Upon receipt of this message 302, the user terminal sends a message 303 to the indicated first address URL1, indicating the associated service token 350 and optionally the associated information. This first address URL1 is for a controller 103-A for the first distribution subnetwork 103. This controller 103-A verifies the validity of the service token indicated in the message 303, on the basis of the service key 360 which it also has available. No limitation is placed on the verification of the token validity. This verification is dependent on the type of token concerned. For example, if the token corresponds to a signature for a URL address (by applying a hash function), then it can be arranged so that a temporary token is generated from the address data, in an entity of the network, then this is compared to the current token. If the token corresponds to an encryption of the URL address data, a decryption can be attempted. Then the data obtained by this decryption are checked for validity.

If the service token is recognized here as valid, then the controller selects at least one second address URL2 of the distribution subnetwork, from which the requested digital content can be distributed, and it generates a session token 351 in association with this address URL2 using its session key 361 which is shared in the distribution subnetwork. When a set of digital content items is involved, a plurality of digital content items available in the distribution subnetwork is determined and a plurality of session tokens respectively associated with said plurality of digital content items is generated.

The session token 351 is obtained from a set of associated information which may comprise one, some, or all of the following elements:

an identifier for a digital content item or an identifier for a set of digital content items;
a service identifier indicating a content distribution policy;
a transaction identifier;
a controller identifier in the distribution subnetwork;
a terminal identifier;
a client identifier;
a service subnetwork identifier;
a token validity duration.

To avoid the reuse of user requests by a third party or by the user terminal itself, it can easily be arranged so that the subnetwork stores certain data carried in the URL address, and does so for the length of the session corresponding to the delivery of the digital content.

Typically, these stored data may be at least one from among the following: the transaction identification, the token itself, another nonce value corresponding to a unique identifier for each request for digital content and valid for a limited time. Some or all of these data may be stored in a database shared by the various elements of the network, or kept directly in file format on a hard drive of one of the network servers and exchanged between the network entities. Such a storage method may be used in particular when the identifier is not already present or a modification to it is requested. If the identifier is already present, the network can then refuse to process the request received.

The controller 103-A sends a message 306 to the user terminal indicating both this second address URL2 and the associated session token 351. The second address URL2 may correspond to the subcontroller for digital content servers 103-B. In that case, upon receipt of this message 306, the user terminal accesses the subcontroller 103-B and provides it with the session token 351 via a message 307. This session token 351 is then verified on the basis of the session key 361 shared in the distribution subnetwork. If the session token is considered to be valid, then the subcontroller 103-B acknowledges receipt of the request from the user terminal via an "ACK" message 309. After receipt of the message 309, the terminal can then order the streaming of the digital content by issuing a play command via a message 310, or stop streaming of this content by a "stop" command via a message 310.

These various actions ordered by the user terminal 101 via a message 110 are sent to the subcontroller 103-B which relays these commands to the servers of the server cluster it is responsible for (servers 104-X i, j, k . . . ). Then, depending on the actions required, the server or servers 104-X send the requested digital content via a data stream 312.

The exchanges were illustrated above using a specific example in which the controller 103-A selects a single subcontroller 103-B, to provide a simple case as an illustration. As represented in FIG. 3, the controller 103-A selects two subcontrollers 103-B and 103-C for managing the transmission of the requested digital content. It therefore selects both the address URL2 for the subcontroller 103-B and the address URL3 for the subcontroller 103-C. It should be noted that it generates one session token per selected subcontroller. The session token is associated with a particular subcontroller. This association allows guaranteeing a level of access security within the distribution subnetwork. It is then impossible for the user terminal to access a subcontroller other than the one that is selected.

Therefore the controller 103-A generates another session token 352 associated with another address URL3 for the subcontroller 103-C. In this case the user terminal receives a message 306 comprising one session token per URL address. More specifically, this message 306 comprises the address URL2 associated with the session token 351 and the other address URL3 associated with the other session token 352. This other session token 352 is then provided during an exchange 307' with the subcontroller 103-C. The subcontroller 103-C is able to verify the validity of this session token on the basis of the session key 361.

The same mechanisms for the digital content as described for the subcontroller 103-B apply for the subcontroller 103-C in relation to the server cluster 104-Y i to k.

One can therefore see that the method is applicable to a variable number of subcontrollers, with the controller 103-A determining the number of subcontrollers involved in the distribution as a function of the digital content desired. Each subcontroller then distributes a portion of the content.

In one variant, a single session token 351 can be generated for accessing the subcontrollers involved in the distribution of the content.

Figure 4:
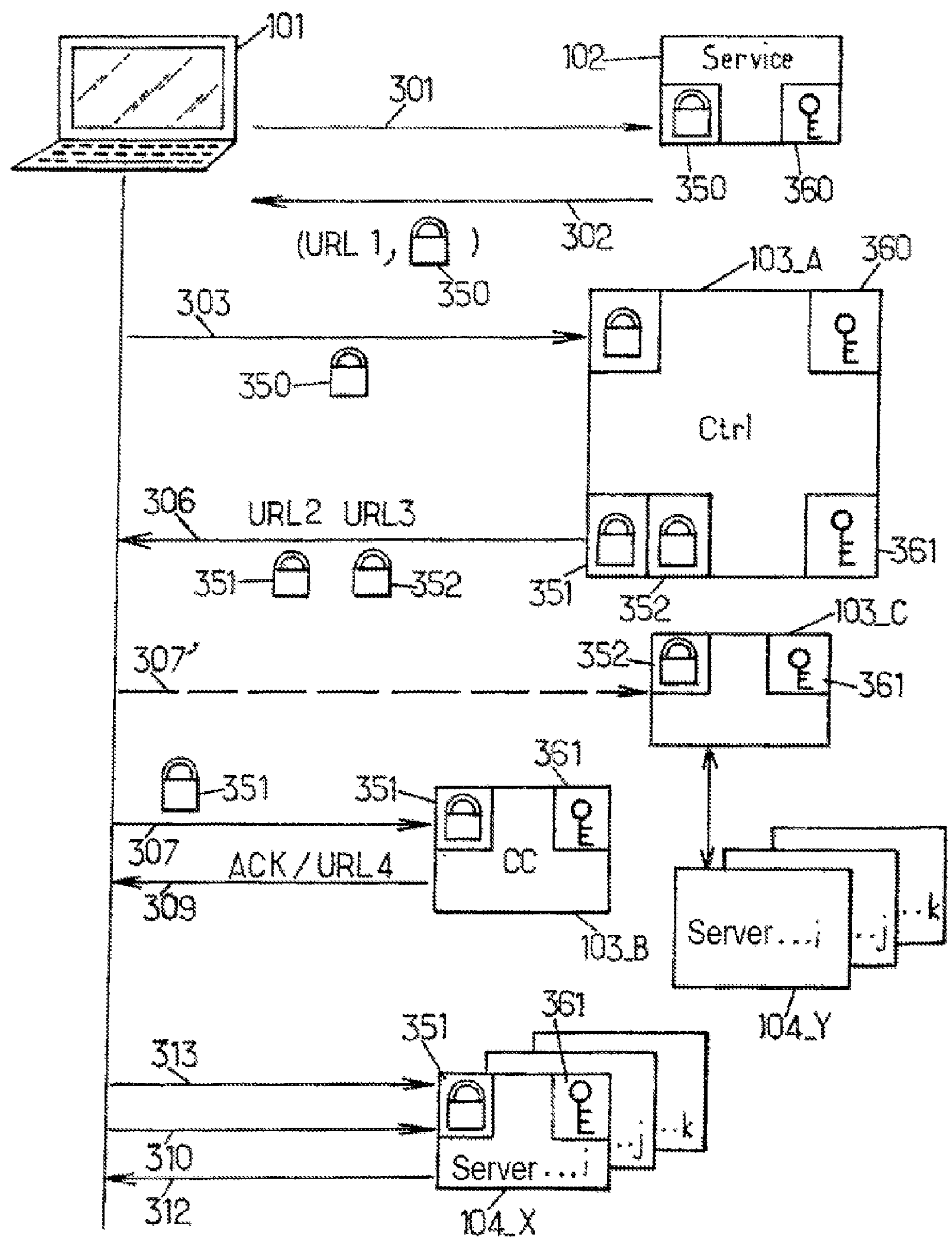
FIG. 4 illustrates an implementation of such a method in another digital content distribution system according to an embodiment of the invention.

FIG. 4 illustrates another digital content distribution network architecture according to an embodiment of the invention. This architecture differs from the previous one illustrated in FIG. 3 in that the servers are themselves able to receive and manage the commands from the user terminal. In order to maintain a level of access security, the servers here are able to verify the validity of the session tokens received from the user terminals. For this purpose, the servers have access to the session key 361 shared in the distribution subnetwork.

FIG. 4 therefore differs from FIG. 3 in that, upon receipt of the message 307, the subcontroller 103-B verifies the validity of the session token 351 and directs the user terminal 101 to an address URL4 which corresponds to that of a server in the server cluster it is responsible for, by issuing a message 309 which indicates the address URL4 for the server 104-X,i for example.

Here, it can be arranged so that the server 104-X,i verifies the validity of the request from the terminal based on the session token 351 used for the verification at the subcontroller 103-B. In this case (illustrated), the session token 351 is sent to the server corresponding to the address URL4, via an exchange 313. This server is able to verify it on the basis of the session key 361. Then, after the validity of the session token has been verified, the user terminal can command actions on the requested digital content. A data stream 312 is then sent from the server concerned to the user terminal 101, controlled by the commands.

Alternatively, the subcontroller 103-B may generate a new session token that it sends in the message 309 in association with the address URL4. In this case, the new session token is indicated in a first exchange of information with the servers 104-X,i concerned. This new session token is then verified at this server. Next the user terminal 101 can issue commands for the requested digital content, such as “play” or “stop” for example. A data stream 312 is then sent from the server concerned to the user terminal 101, controlled by the commands.

Figure 5:
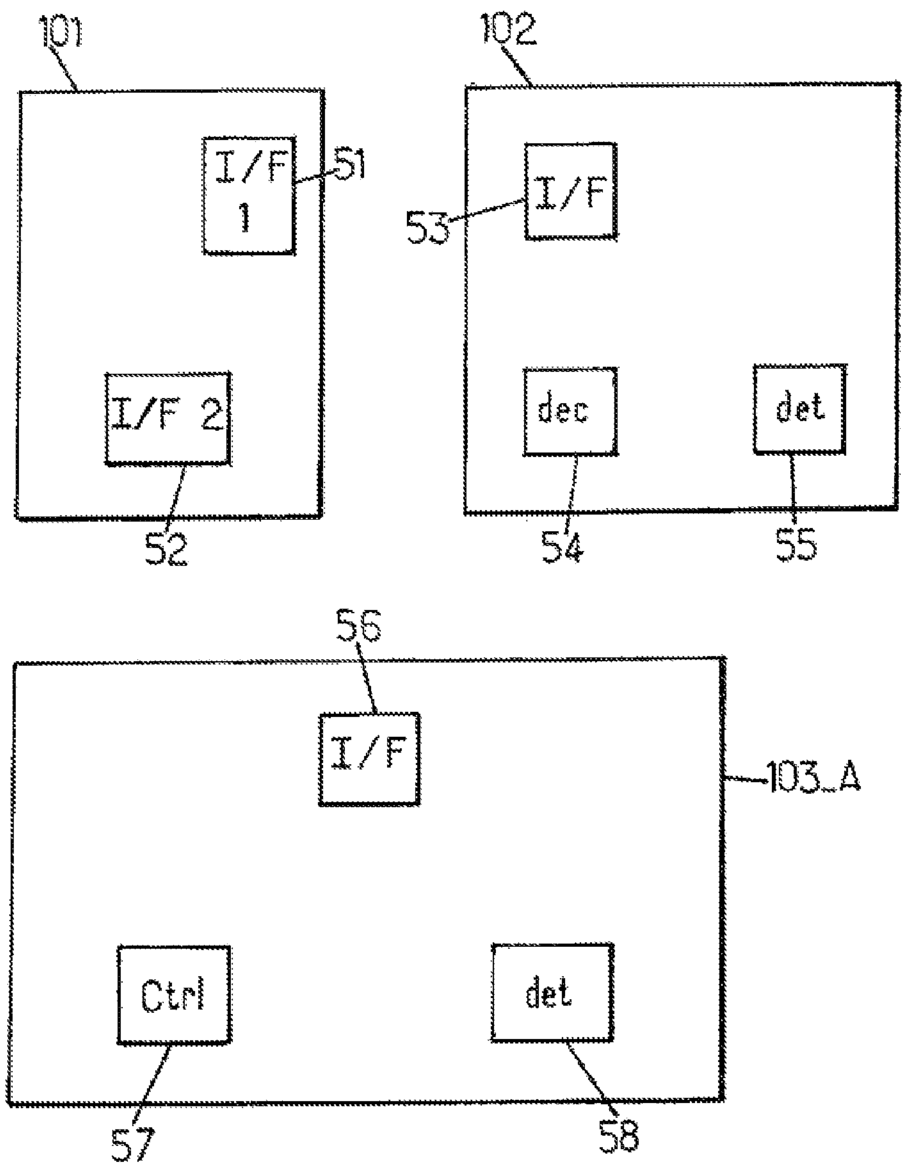
FIG. 5 illustrates a user terminal, a service subnetwork, and a distribution subnetwork controller according to an embodiment of the invention.

FIG. 5 illustrates a user terminal 101 according to one embodiment of the invention. It comprises:

- a first interface 51 with the service subnetwork, adapted to request a digital content item and to receive a first address relating to the control part of the distribution subnetwork and an associated service token;
- a second interface 52 with the distribution subnetwork, adapted to:
  - request the digital content from said first address, indicating the associated service token;
  - receive a second address relating to the transmission part of the distribution subnetwork and an associated session token;
  - request the digital content from said second address, indicating the associated session token; and
  - receive the digital content.

FIG. 5 also illustrates a service subnetwork 102, which comprises:

- a unit 53 for interfacing with a user terminal, adapted to:
  - receive a request for digital content from the user terminal; and
  - if applicable, send a message indicating said address and the associated service token to the user terminal;
- a decision unit 54 which decides whether to authorize the user terminal on the basis of decision criteria; and
- a determination unit 55 which determines an address relating to the distribution subnetwork and generates an associated session token.

FIG. 5 also illustrates a controller 103-A for a distribution subnetwork 103, comprising:

- an interface unit 56 which receives a request for digital content from the user terminal indicating a service token, and which, if applicable, sends a message to the user terminal indicating said address and the associated session token;
- a control unit 57 which verifies the validity of the service token; and
- a determination unit 58 which determines an address relating to the distribution subnetwork and generates an associated session token.

A subcontroller 103-B for a distribution subnetwork 103 comprises a control unit able to verify the validity of the session token.

The invention claimed is:

1. A method for managing the transmission of a digital content item to a user terminal in a network comprising a service subnetwork adapted to provide the terminal with a service token and a digital content distribution subnetwork which includes a control part and a transmission part, said service token being associated with an address of the distribution subnetwork;

said management method comprising the following steps in the control part of the distribution subnetwork:

/1/ receiving a request from the user terminal for a digital content item, indicating a service token;

/2/ if the service token is recognized as valid, determining an address relating to the distribution subnetwork and generating a session token associated with said address; and /3/ sending a message to the user terminal, indicating said address and the session token associated with said address.

2. The management method according to claim 1, wherein in step /2/ a plurality of addresses relating to the distribution subnetwork is determined and a plurality of session tokens respectively associated with said plurality of addresses is generated.

3. The management method according to claim 1, wherein the session token is protected using a session key which is shared at the distribution subnetwork level.

4. A method for managing the transmission of a digital content item to a user terminal in a network comprising a service subnetwork and a digital content distribution subnetwork which includes a control part and a transmission part; said management method comprising the following steps in the service subnetwork:

/1/ receiving a request from the user terminal for a digital content item;

/2/ deciding whether to authorize the user terminal on the basis of decision criteria;

/3/ determining an address relating to the distribution subnetwork and generating a service token associated with said address; and /4/ sending a message to the user terminal, indicating said address and the service token associated with said address.

5. The management method according to claim 4, wherein the service token is sent in encrypted form using a service key, said service key also being known in the distribution subnetwork.

6. A method for managing the transmission of a digital content item to a user terminal in a network comprising a service subnetwork and a digital content distribution subnetwork which includes a control part and a transmission part; said management method comprising the following steps at the user terminal:

/1/ requesting a digital content item from the service subnetwork;

/2/ receiving a first address relating to the control part of the distribution subnetwork and a service token associated with said first address;

/3/ requesting the digital content item from said first address, indicating the service token associated with said first address;

/4/ receiving a second address relating to the transmission part of the distribution subnetwork and a session token associated with said second address;

/5/ requesting the digital content item from said second address, indicating the session token associated with said second address; and /6/ receiving the digital content.

7. The management method according to claim 6, wherein the service token is received and indicated in encrypted form using a service key known to both the service subnetwork and in the distribution subnetwork; and wherein the session token is received and indicated in encrypted form using a session key which is known in the distribution subnetwork.

8. The management method according to claim 6, wherein, in step /4/, a plurality of addresses relating to the transmission part of the distribution subnetwork and a plurality of session tokens respectively associated with the plurality of addresses are received; and wherein, in step /5/, the digital content is requested from said plurality of addresses while respectively indicating the session tokens associated with the plurality of addresses.

9. A service subnetwork in a digital content management network additionally comprising a digital content distribution subnetwork which includes a control part and a transmission part;

said service subnetwork comprising:

a unit for interfacing with a user terminal, adapted to:

receive a request for digital content from the user terminal; and if applicable, send a message to the user terminal indicating said address and the service token associated with said address;

a decision unit which decides whether to authorize the user terminal on the basis of decision criteria; and a determination unit which determines an address relating to the distribution subnetwork and generates a service token associated with said address.

10. A controller for a distribution subnetwork in a digital content management network additionally comprising a service subnetwork adapted to provide a terminal with a service token, said distribution subnetwork including a control part and a transmission part, said controller comprising:

an interface unit which receives a request for digital content from the user terminal indicating a service token, and which, if applicable, sends a message to the user terminal indicating an address and a session token associated with said address;

a control unit which verifies the validity of the service token; and a determination unit which determines said address relating to the distribution subnetwork and generates a session token associated with said address.

11. A network for managing the transmission of digital content to a user terminal, said network comprising;

a service subnetwork according to claim 9; and a digital content distribution subnetwork which includes a controller for a distribution subnetwork in a digital content management network additionally comprising a service subnetwork adapted to provide a terminal with a service token, said distribution subnetwork including a control part and a transmission part, said controller comprising:

an interface unit which receives a request for digital content from the user terminal indicating a service token, and which, if applicable, sends a message to the user terminal indicating an address and a session token associated with said address;

a control unit which verifies the validity of the service token;

a determination unit which determines said address relating to the distribution subnetwork and generates a session token associated with said address; and a transmission part arranged to verify the validity of the session token.

12. A non-transitory computer program product comprising instructions for implementing the method according to claim 1 when this program is executed by a processor.

13. A non-transitory computer program product comprising instructions for implementing the method according to claim 4 when this program is executed by a processor.

14. A non-transitory computer program product comprising instructions for implementing the method according to claim 6 when this program is executed by a processor.

* * * * *